Dec. 24, 1957  R. A. FLINN  2,817,232
APPARATUS FOR STRESSING AND VIEWING METALLURGICAL SPECIMENS
Filed July 14, 1954
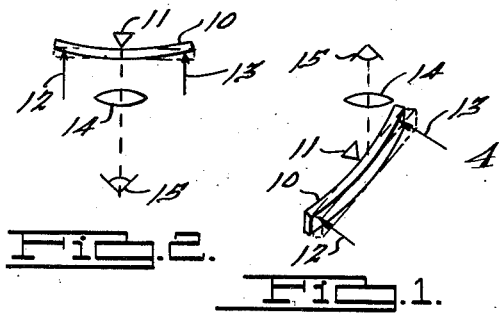
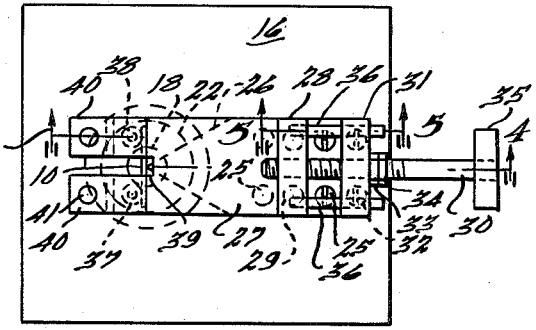
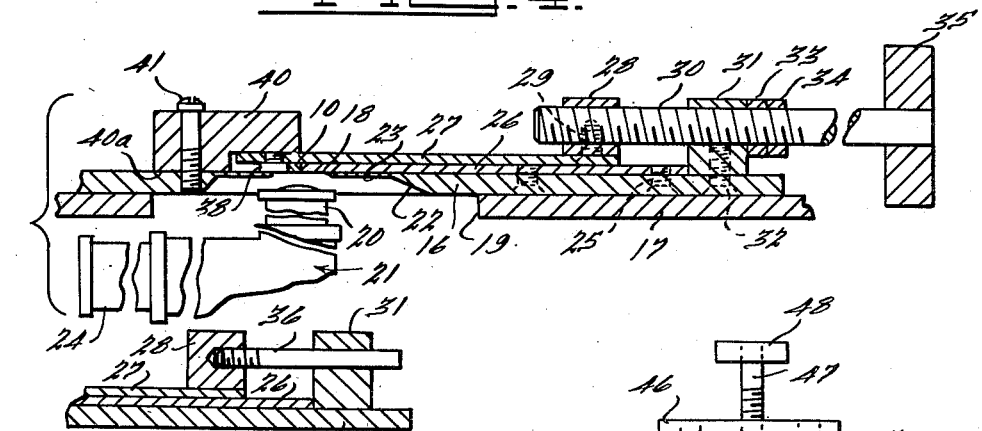
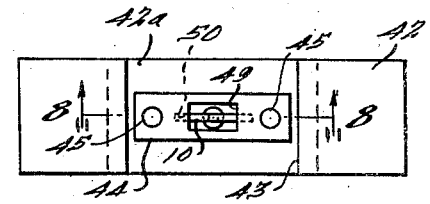
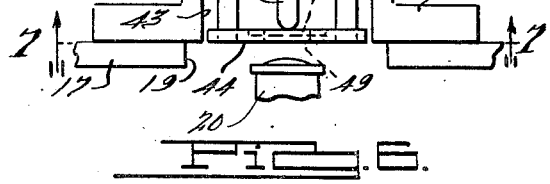
INVENTOR.
Richard A. Flinn
BY Jay C. Taylor
ATTORNEY.

United States Patent Office 2,817,232
Patented Dec. 24, 1957

2,817,232

APPARATUS FOR STRESSING AND VIEWING METALLURGICAL SPECIMENS

Richard A. Flinn, Ann Arbor, Mich.

Application July 14, 1954, Serial No. 443,233

5 Claims. (Cl. 73—100)

This invention relates to the study of the microstructure of metallurgical specimens under stress and has for its principal object the provision of a simple, improved, and readily applied apparatus for studying such specimens under magnification at the zone of maximum stress as well as intermediate zones.

It is generally accepted among metallurgists that the microstructure of a metal is the fundamental variable determining mechanical properties. On the other hand, largely because of the difficulty heretofore of properly observing the microstructure under stress, engineers have been prone to select other favored measurements, such as hardness by way of example, as an index not only of tensile strength but also of wear resistance, endurance limit, and often service performance.

It has been common to perform a group of tensile tests on a selected set of microstructures and thereafter to correlate the resulting structure with performance. Such procedure is in the nature of a post-mortem examination wherein the actual contributions to flow and fracture mechanisms of the individual microconstituents under stress are often hard to deduce. Even when a cross section of the tensile fracture is examined metallographically, the probability of finding the zone where fracture initiated is very small. Furthermore the customary post-fracture metallographic examination has heretofore missed much of the evidence that would have been available if continuous observation could have been made of the microstructure during deformation. The performance of the more complex microstructures, such as mixtures of massive carbides, graphite, sustenite and its transformation products is likewise difficult to evaluate from examination of fractures or by means of such gross tests as the usual tensile, compressive, and other relatively large scale tests.

There has accordingly been a long standing demand for a suitable device to facilitate the metallographic observation of specimens under stress. Attempted studies heretofore have been limited to the observation of thin specimens subjected to direct endwise tension. Such observations were subject to the difficulties arising from the well known internal fracture in tension and the inability to predict the proper area for observation as the fracture was caused to proceed to the surface, as well as the difficulty of maintaining the area of maximum stress in focus to permit observation under high magnification.

It is another object of the present invention to provide an improved apparatus whereby a metallurgical beam specimen is bent by the application of force to its ends while holding an intermediate region of the specimen fixed. The bending is carried out so that the area of maximum stress remains substantially fixed at a predetermined surface location susceptible of direct and continuous observation under high magnification throughout the bending operation, thereby to facilitate the study of surface coatings and treatments, weld boundaries, stress concentrations, the inception of fatigue cracks, and the like.

Other objects of this invention will appear in the following description and appended claims, reference being had to the accompanying drawings forming a part of this specification wherein like reference characters designate corresponding parts in the several views.

Fig. 1 is a schematic perspective view illustrating one application of the present invention.

Fig. 2 is a schematic plan view illustrating another application of the present invention.

Fig. 3 is a plan view of a specific embodiment of the present invention.

Fig. 4 is a fragmentary enlarged sectional view taken in the direction of the arrows substantially along the broken line 4—4 of Fig. 3, illustrating the apparatus of Fig. 3 mounted on the stage of a metallurgical microscope, the latter being shown diagrammatically.

Fig. 5 is a fragmentary enlarged view taken in the direction of the arrows substantially along the line 5—5 of Fig. 3.

Fig. 6 is a side elevational view illustrating another specific embodiment of the present invention mounted on the stage of a metallurgical microscope, the latter being shown diagrammatically.

Fig. 7 is a bottom view of the apparatus shown in Fig. 6, taken in the direction of the arrows along the line 7—7.

Fig. 8 is a sectional view through the specimen holder, taken in the direction of the arrows along the line 8—8 of Fig. 7.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed in the specification is for the purpose of description and not of limitation, the scope of applicant's invention being determined by the wording of the claims Referring to the drawings, two illustrations of the study of metallurgical specimens utilizing the structure of the present invention are indicated schematically in Figs. 1 and 2. Briefly the operation of the present device includes supporting an elongated beam specimen adjacent its mid-region by means of a fixed stop. Force is then applied at the ends of the beam to bend the latter around the stop as a fulcrum, whereby the zone of maximum stress will be at the region of the stop and will remain fixed for continuous observation. This operation lends itself to two basic studies referred to herein as the side-of-beam and bottom-of-beam observation respectively.

Fig. 1 illustrates the side-of-beam observation for general exploration of the reaction of the microstructure to the stress gradient existing at the side of the beam. Since the stress varies from maximum tension at the convex side of the bend, through zero at the neutral axis, and to maximum compression at the concave side of the beam, the effects of stress at different levels can be readily observed along a line of sight at right angles to the direction of the force effecting the bend.

In order to permit maximum flexibility of specimen selection from interesting regions such as welds and special surfaces, a small specimen size is preferably employed of approximately one inch length and one-sixteenth inch square cross section. Where it is desired to avoid stress concentrations at the corner edges, which occur in plastic flow, these edges are preferably rounded. In the usual instance the beam specimen is prepared by milling a one-sixteenth inch square strip from the desired specimen material. Harder specimen materials are sectioned by means of a cooled abrasive wheel and then surface ground to size. After the rough preparation, a number of the specimen beams are mounted in a thermal setting resin and polished metallographically at the surface to be observed by the usual sequence of abrasive papers and finally by diamond dust of approximately one micron size. The specimen beams are then removed from the plastic mount and employed either in an etched or unetched condition. In many instances it is desirable to employ an unetched specimen, since the development of true slip bands rather than etch bands is thus more readily observed.

In carrying out the side-of-beam observation, a specimen 10 formed as above described is supported with its central region against a fixed stop 11. The latter holds the central region substantially fixed while force is applied in the direction of the arrows 12 and 13 at the ends of the beam to bend the latter about the stop 11. Throughout the bending movement the polished side of the beam is observed under magnification through the objective lens 14 from the point of view 15, which may comprise a camera or other recording device as well as the eye of the observer. By reversing the position of the stop 11 so as to engage the opposite side of the specimen 10, and also by reversing the direction of the forces 12 and 13, the effect of reverse bending is readily observed.

Fig. 2 illustrates the method of bottom-of-beam observation which is particularly useful in the study of comparatively brittle materials as well as for ductile alloys where a detailed study of the surface of maximum tension is desired. In Fig. 2 the specimen is prepared as described above and similarly held fixed at its central region while bending force is applied to its ends. In this instance the line of sight of the optical system is parallel to the bending force so that the very first manifestations of slip, flow, and fracture can be observed. In both the side-of-beam and bottom-of-beam studies, the region of the specimen under maximum stress remains at a fixed distance from the objective 14, so that the region of stress is readily maintained in focus and within the field of view under high magnification of say a thousand diameters.

Referring to Figs. 3 through 5, a particular embodiment of the present invention useful for side-of-beam observation is illustrated by way of example comprising a support or plate 16 of rigid material having a flat bottom surface adapted to be supported on the stage 17 of a conventional metallurgical microscope. An observation opening 18 of smaller diameter than the length of the specimen 10 and adapted to be aligned with the customary opening 19 within the stage 17 is formed in the plate 16. In order to receive the objective 20 of the microscope 21 in proximity to the specimen under observation, the surface of the plate 16 confronting the objective is provided with a conical recess 22 coaxial with the opening 18, thereby to effect an annular plate portion 23 of reduced thickness around the opening 18. The microscope 21 including the customary eyepiece 24 and stage 17 may be of conventional construction and is accordingly indicated schematically in Fig. 4.

Secured to the upper surface of the plate 16 by a plurality of screws 25 is a fixed stop 26 of rigid sheet material which converges to the left in Fig. 3 to a specimen engaging portion or point centered approximately over the opening 18. Immediately overlying the stop 26 is a slide 27 secured at one end to the underside of a screw block 28 by screws 29. Extending horizontally through the block 28 in screw threaded engagement therewith is an operating screw 30 rotatably supported within the bore of a fixed guide block 31 secured to the support 16 by screws 32. The operating screw 30 is not in screw threaded engagement with the block 31, but is slidable axially therethrough, the limit of leftward movement being adjustably determined by a pair of locking nuts 33 and 34 tightened together on the screw 30 at the right of the block 31. Operation of screw 30 is facilitated by the knurled handle member 35. Extending parallel to the screw 30 at its opposite sides are a pair of guide dowels 36, Fig. 5, which slide through block 31 in guided relation and are screwed at their leftward ends firmly into block 28, thereby to guide axial movement and to prevent cocking of screw 30 within the bore of block 31.

Underlying the slide 27 at opposite sides of the axis of screw 30 and spaced apart a distance approximately equal to the diameter of opening 18 are a pair of force exerting posses or portions 37 and 38 having upper screw threaded portions screwed tightly into slide 27. The bosses 37 and 38 are arranged to engage opposite end portions of the specimen 10 in opposition to the stop 26, Fig. 3, when the specimen 10 is arranged on the reduced plate portion 23 to overlie the opening 18 transversely to the axis of the screw 30. When the specimen 10 is thus arranged with its central portion abutting the apex of stop 26, the screw 30 is turned to draw the block 28 and slide 27 rightward. In consequence the specimen 10 is caused to bend around the apex of the stop 26 as a fulcrum while the central portion of the specimen overlying the objective 20 remains in fixed focus to permit side-of-beam observation as aforesaid. Observation of the specimen 10 from above is facilitated by a slit 39 formed in the left end of the slide 27 intermediate the bosses 37 and 38 so as to expose the tip of stop 26.

Preferably the vertical thickness of the stop 26 is the same as the vertical thickness of the specimen 10, so that the latter is snugly confined against vertical movement between the upper side of the plate portion 23 and under side of the slide 27. In this regard, a pair of fixed shackles 40 spaced by the opening 39 closely overlie the leftward ends of slide 27 to prevent upward movement thereof during a bending operation. At the left of the slide 27, the shackles 40 extend downwardly at 40a to the plate 16 and are firmly secured thereto by screws 41. By the construction described, the polished under surface of the specimen 10 may be readily observed under high magnification during the bending operation. Where desired to prevent magnetizable particles of the specimen from falling on the objective lens 20 in the event of splintering, one or more elements of the device adjacent the specimen 10, as for example the stop 26, slide 27, or shackles 40, are magnetized.

A modification of the invention particularly adapted for bottom-of-beam observation is illustrated in Figs. 6 through 8, wherein a support 42 is provided with an upper central thickened portion 42a and a flat bottom surface adapted to be supported on the customary microscope stage 17. A recess 43 adapted to overlie the opening 19 in the stage is formed in the under surface of the thickened portion 42a to receive a vertically shiftable specimen holder or carrier 44. The latter is firmly secured adjacent opposite ends to the lower ends of a pair of vertically slidable dowels 45, which extend upwardly in guided relation through bores in the support portion 42a and are secured at their upper ends to opposite ends at a horizontal cross yoke 46. Extending vertically through the central portion of the yoke 46 in screw threaded engagement therewith is a vertical operating screw 47 having a knurled knob 48 at its upper end. The lower end of screw 47 abuts the central upper support portion 42a, whereby the yoke 46 and holder 44 are shifted vertically by suitable rotation of the knob 48.

Centered within the carrier 44 and extending vertically therethrough is a rectangular observation hole or opening 49 having smaller dimensions than the length of the specimen 10. In the upper surface of the holder 44 at opposite ends of the hole 49 are a pair of upwardly opening locating slots 50 arranged to contain opposite ends of the specimen 10 snugly therein, Fig. 8. Directly above the specimen 10 when the latter is confined within the locating slots 50 is a fixed stop 51 firmly confined at its upper end within the support portion 42a. A lower rounded nose of the stop 51 is arranged to engage the central portion of the specimen 10 to hold the latter in fixed position with respect to the objective 22 when the holder 44 is urged upwardly by operation of the screw 47. Accordingly the bottom of the beam at the region of maximum stress is contained in fixed focus to permit continued study or observation of the specimen as the stress thereon is gradually increased or relaxed. By virtue of the structure of the carrier 44, the specimen is positively located for observation and is prevented from accidentally falling through the opening 49. Likewise as in the case of the structure illustrated in Figs. 3 through 5, the stop 51 or the carrier 44 are magnetized where necessary to prevent splinters of the specimen from falling on the objective 20.

I claim:

1. In a bending apparatus useful in the study of metallurgical specimens, a support having an opening therein and adapted to be mounted on the stage of a microscope with said opening on the optical axis of said microscope, a stop mounted on said support and fixed with respect thereto, said stop having a portion adjacent said axis and adapted to engage the central region of one side of a specimen, force exerting means shiftably mounted on said support adapted to engage the opposite side of said specimen adjacent the ends thereof, and means on said support for shifting said force exerting means against said specimen to urge the same against said stop, thereby to cause said specimen to bend about said stop as a fulcrum while holding said central region substantially fixed with respect to said microscope.

2. In a bending apparatus useful in the study of metallurgical specimens, a support having a recess therein and adapted to be mounted on the stage of a microscope with said recess confronting the objective lens of said microscope to receive the same, said support also having an observation hole opening into said recess from the side thereof opposite said objective lens, said support being adapted at the last named side to support said specimen bridging said hole, a stop mounted on said support and fixed with respect thereto, said stop having a portion located adjacent the central region of a side of said specimen to block movement thereof in one direction transversely to the line of sight from said lens into said observation hole, force exerting means shiftably mounted on said support and having portions located adjacent the ends of said specimen to engage the same opposite said first named side thereof, and means on said support for shifting said force exerting means against said specimen to urge the same against said stop, thereby to cause said specimen to bend about said stop as a fulcrum while holding said central region in focus with respect to said lens.

3. In a bending apparatus useful in the study of metallurgical specimens, a support having a recess therein and adapted to be mounted on the stage of a microscope with said recess confronting the objective lens of said microscope, a specimen holder shiftable within said recess parallel to the line of sight from said lens into said recess, an observation hole extending through said holder along said line of sight, said holder being adapted at the side thereof opposite said lens to support said specimen bridging said hole, a stop mounted on said support and fixed with respect thereto, said stop having a portion located adjacent the central region of the side of said specimen remote from said lens to block movement of said region in the direction away from said lens, and means on said support connected with said holder to move the same in said direction, thereby to cause said specimen to bend about said stop as a fulcrum while holding said central region in focus with respect to said lens.

4. In a metallographic apparatus, supporting means having an observation opening and adapted to be mounted on the stage of a microscope with said opening on the optical axis of said microscope, a stop mounted on said supporting means and fixed with respect thereto, said stop having a portion adjacent said axis and adapted to engage an intermediate portion of a specimen, force exerting means shiftably mounted on said supporting means and having spaced portions adapted to engage said specimen in opposition to said stop at opposite sides thereof, and means on said supporting means for shifting said force exerting means against said specimen to urge the latter against said stop, thereby to bend said specimen about said stop as a fulcrum while holding said intermediate region substantially fixed with respect to said microscope.

5. In a metallographic apparatus, supporting means adapted to be mounted on the stage of a microscope, a specimen holder having an observation opening and shiftably mounted on said supporting means with said opening on the optical axis of said microscope, said holder at opposite sides of said opening being adapted to engage said specimen spanning said opening, a stop mounted on said supporting means and fixed with respect thereto, said stop having a portion adjacent said axis and adapted to engage an intermediate portion of said specimen between said sides in opposition to said holder, and means on said supporting means for shifting said holder and specimen to urge the latter against said stop, thereby to bend said specimen about said stop as a fulcrum while holding said intermediate region substantially fixed with respect to said microscope.

References Cited in the file of this patent

UNITED STATES PATENTS

| | | |
|---|---|---|
| 1,409,842 | Foster | Mar. 14, 1922 |
| 1,458,259 | Wille | June 12, 1923 |
| 1,551,282 | Beggs | Aug. 25, 1925 |
| 1,711,347 | Harter | Apr. 30, 1929 |
| 1,827,805 | Watts | Oct. 20, 1931 |
| 2,050,186 | Klemperer | Aug. 4, 1936 |
| 2,249,649 | Fielding | July 15, 1941 |
| 2,294,897 | Ellis | Sept. 8, 1942 |
| 2,347,454 | Beckett | Apr. 25, 1944 |
| 2,380,159 | Eksergian | July 10, 1945 |
| 2,670,624 | Faris et al. | Mar. 2, 1954 |
| 2,676,486 | Lazan | Apr. 27, 1954 |

FOREIGN PATENTS

| | | |
|---|---|---|
| 213,059 | Germany | Sept. 6, 1909 |
| 593,912 | Germany | Mar. 10, 1934 |